(No Model.)
C. H. DOUGLAS.
SAW.
No. 431,510. Patented July 1, 1890.
FIG. 1.
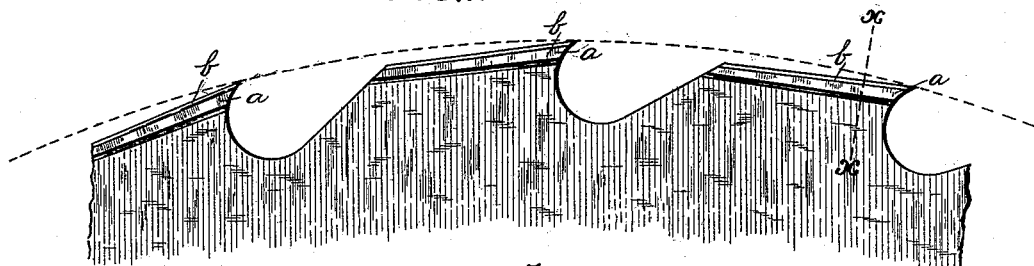
FIG. 2.
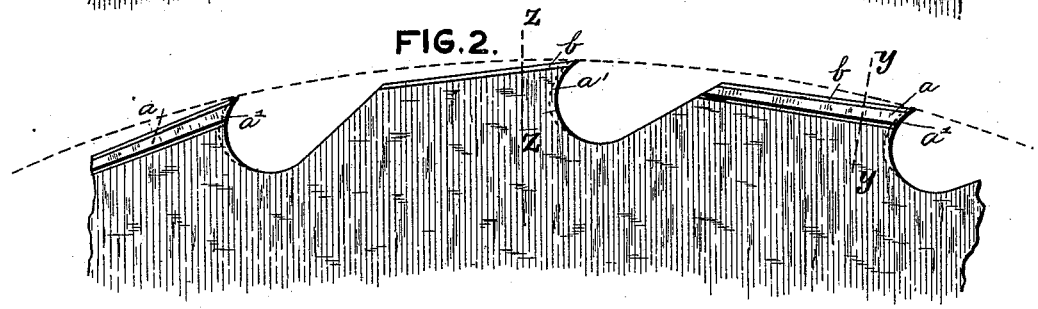
FIG. 3.
FIG. 8.
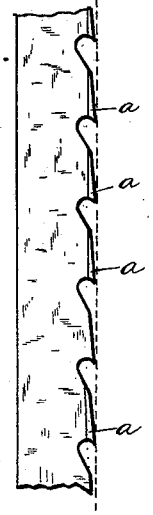
FIG. 4.    FIG. 5.    FIG. 6.    FIG. 7.
   
ATTEST.
J. Henry Kaiser.
INVENTOR.
Charles H. Douglas.

UNITED STATES PATENT OFFICE.

CHARLES H. DOUGLAS, OF WASHINGTON, DISTRICT OF COLUMBIA, ASSIGNOR OF ONE-FOURTH TO ELDRIDGE J. SMITH, OF SAME PLACE.

SAW.

SPECIFICATION forming part of Letters Patent No. 431,510, dated July 1, 1890.

Application filed November 19, 1889. Serial No. 330,837. (No model.)

*To all whom it may concern:*

Be it known that I, CHARLES H. DOUGLAS, a citizen of the United States, residing at Washington, in the District of Columbia, have invented certain new and useful Improvements in Saws; and I do declare the following to be a full, clear, and exact description of the invention, such as will enable others skilled in the art to which it appertains to make and use the same.

The object of my invention is to make a durable saw and one easily kept in order, that will cut its way through timber with much less power than other saws, and at the same time leave the surfaces each side of the kerf as smooth as if planed, and thereby produce lumber direct from the saw with surfaces so smooth that they do not require planing. I attain this object by the form and device of my saw-teeth, which are illustrated in the accompanying drawings, in which—

Figures 1 and 2 are side elevations of segments of circular saws embracing my improvements. Fig. 3 is an edge view of Fig. 2; Fig. 4, a section through Fig. 1 at $x\,x$; Figs. 5 and 6, sections of Fig. 2 at $y\,y$ and $z\,z$; Fig. 7, a section of Fig. 1, with corners rounded instead of beveled; and Fig. 8 is a piece of a straight or band saw provided with similar teeth.

Similar letters refer to similar parts in the several views.

The teeth are so formed as to make a perfect shaving cut, and hence in making the kerf they take out shavings instead of breaking the chips into sawdust. The heel of each tooth is, therefore, nearly as far from the center of the saw as the point, the angle of the clearance from the line of the cut being only about one or two degrees.

On one or both sides of each tooth there is a rib $a\,a$, which extends from the point to the heel or toward it, and is longest in line with the cut, and the outside edges or corners are beveled off, as at $b\,b$, or rounded, as shown in Fig. 7. These ribs $a\,a$ have each a flat surface that is nearly or quite parallel with the sides of the saw and project beyond them one-hundredth of an inch or more. They may be put on both sides of the same tooth, as shown in Figs. 1 and 4, or on one side of one tooth and on the opposite side of the next, &c., as shown in Figs. 2, 3, 5, and 6.

The prime object of beveling or rounding the corners $b\,b$ is to cause the points or cutting-edges of the teeth to remain sharp and operative a much longer time than they would with a sharp right-angle corner, and also to cause the teeth to cut more freely and require less power to accomplish a given amount of work. In applying this form of teeth to the band or straight saw, Fig. 8, the ribs may be made on both sides of the sawtooth, or on one side of each, as in the circular saw described; but in either case it is better to bevel or round the outside corners on the back of each tooth at $b\,b$, for the reasons hereinabove stated.

In my saw the kerf is enlarged by the ribs $a\,a$, which effectually prevent it dodging sidewise when it comes in contact with knots or cross-grains, and enables me to slant the backs of the teeth at so slight an angle from the line of the cut as to produce shavings instead of sawdust without causing it to "run" out of a straight line.

The ribs $a\,a$ may be shorter than the back of the tooth, when required, and in some kinds of work may be required to be more prominent on the point or cutting end than on the back end, but should be beveled or rounded on the outer edge or corner at $b\,b$, in order to give durability to the point of the tooth and ease of cut.

What I claim is—

1. A saw provided with the teeth so formed or constructed that the backs have a clearance of less than five degrees angle from the line of cut, and on the sides of which there are ribs which extend from the cutting-points toward the heel, that are nearly or quite parallel with the face of the saw, and are slightly beveled or rounded along its outer edge at $b$, substantially as specified.

2. A saw-tooth that is constructed with a rib on one side of the back which is slightly beveled or rounded along its outer edge at $b$, substantially as specified.

3. A saw having a series of ribs upon both of its sides, said ribs extending back from the cutting-edge of each tooth and having their outer edge rounded or beveled, substantially as described.

4. A saw having a series of ribs upon its side, said ribs extending back from the cutting-edge of each tooth and having their outer edge rounded or beveled, substantially as shown and described.

5. A saw having a rib on each side of the cutting teeth, said ribs forming a part of the cutting-edge and extending back on a line even with the outer edge of the saw-blade and having their outer edges rounded or beveled, substantially as described.

6. A saw having a series of ribs $a$ $a$ upon the sides of the blade, the front ends of which form a part of the cutting-teeth of the saw, said ribs extending back from the cutting-edge on a line parallel with the outer edge of the projection upon which the cutting-teeth are formed and having their outer edges $b$ $b$ rounded or beveled, substantially as shown and described.

In testimony whereof I affix my signature in presence of two witnesses.

CHARLES H. DOUGLAS.

Witnesses:
M. J. CLAGETT,
ELDRIDGE J. SMITH.